Dec. 4, 1956  C. F. MORTON  2,772,839
FISHING REEL

Original Filed Aug. 10, 1954  2 Sheets-Sheet 1

INVENTOR
Cullen F. Morton

Dec. 4, 1956  C. F. MORTON  2,772,839
FISHING REEL
Original Filed Aug. 10, 1954  2 Sheets-Sheet 2

INVENTOR
Culley F. Morton

United States Patent Office 2,772,839
Patented Dec. 4, 1956

2,772,839

FISHING REEL

Cullen F. Morton, Booneville, Miss.

Original application August 10, 1954, Serial No. 448,862. Divided and this application August 29, 1955, Serial No. 530,931

1 Claim. (Cl. 242—84.5)

An important object of this invention is to provide a frictional means of retarding rotation of the reel, which frictional means may be easily adjusted or released entirely from operating. By releasing the retarding mechanism entirely from operating, the freest possible rotation of the reel is achieved.

Still another object of this invention is to relocate to a less obstructive position the frictional brake adjusting knob usually found between the operating handles on other reels of this general type.

This application is a division of application No. 448,862, filed August 10, 1954 and now abandoned.

The full nature of this invention will be understood from the accompanying drawings and the following description and claim.

Figure 1:
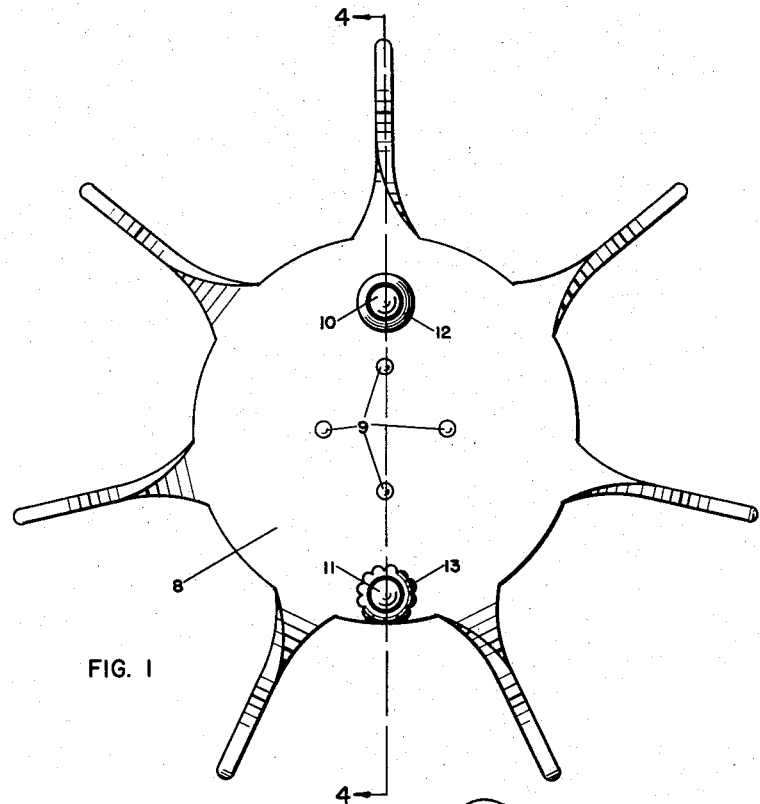
Figure 2:
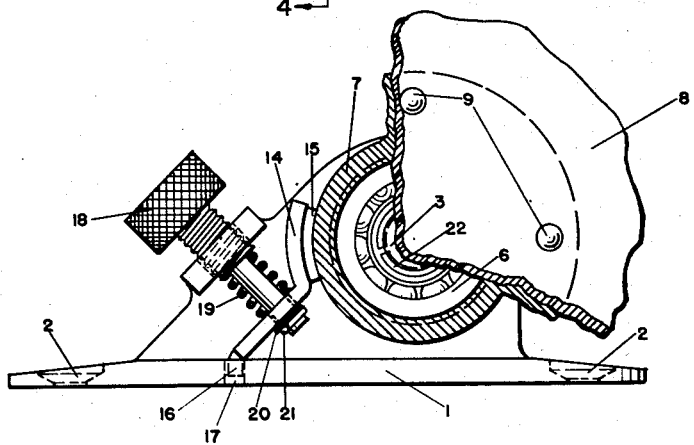
Figure 4:
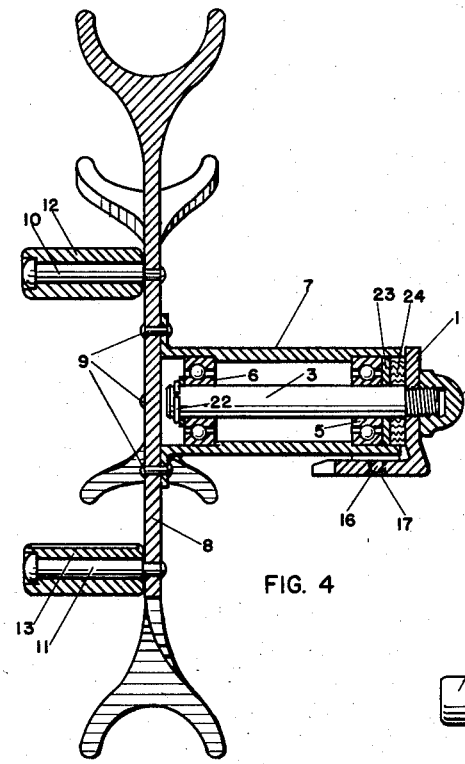
Figure 3:
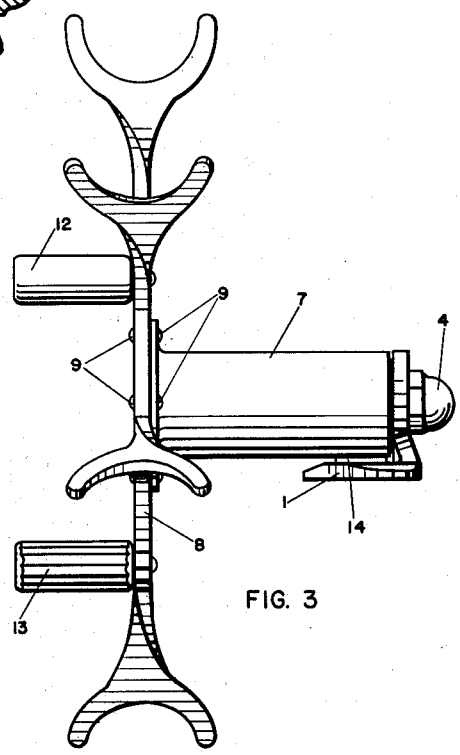
Figure 5:
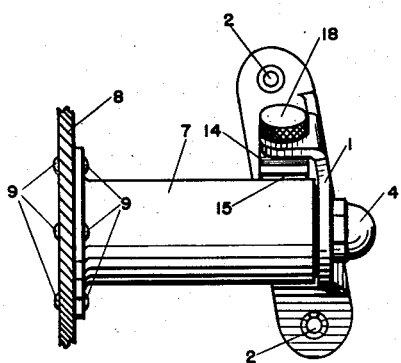

In the drawings Figure 1 is a front elevation of the reel. Figure 2 is an enlarged sectional view taken in the same plane as Figure 1 and showing the brake mechanism. Figure 3 is a side elevation of the reel. Figure 4 is a vertical sectional view taken on line 4—4 of Figure 1. Figure 5 is a partial plan view showing the hub and reel seat.

Referring to the drawings, wherein for the purpose of illustration is shown a preferred embodiment of the invention, and wherein like numbers refer to like parts, the numeral 1 designates the reel seat, which is of such shape and size as will fit the majority of offset-type fishing rods on the market. The reel seat 1 is also provided with holes 2 for permanent mounting to the rod with screws or bolts if the user so desires. Spindle 3 is attached to the reel seat 1 by threads and by cap nut 4. Ball bearings 5 and 6 are disposed between counterbores in hub 7 and spindle 3 which are concentrically arranged. Reeling spider 8 which receives the line as it is wound upon the reel is attached to hub 7 by rivets 9. Handle pins 10 and 11 pass through rotatable operating handles 12 and 13 and are riveted to reeling spider 8 in diametrically opposed locations and at different distances from the axis of rotation of reeling spider 8. Handle 12 being closer to the axis of rotation offers the user less leverage, which is desirable in fast reeling in of the line. Handle 13 being farther from the axis of rotation offers the user more leverage which is desirable when more energy must be expended in reeling, as when reeling in a fish. Handles 12 and 13 are of different shapes which assists the user in selecting the desired handle by the sense of feel. Handles 12 and 13 are also of different colors which assists the user in selecting the desired handle by the sense of sight. Brake arm 14 has a felt brake shoe 15 affixed to the upper end which may be adjusted to contact hub 7 to cause retarding of reel rotation. The lower end of brake arm 14 has an integral tab 16 which engages hole 17 in reel seat 1, providing a hinged connection between brake arm 14 and reel seat 1. Tension adjusting screw 18 has a threaded portion which is received by a threaded hole in a flanged portion of reel seat 1. A shoulder below the threaded portion of tension adjusting screw 18 contacts the upper end of tensioning spring 19 and an unthreaded portion of reduced diameter extends through tensioning spring 19, through a slot in brake arm 14, and through washer 20. A circumferential groove around the lower end of the unthreaded portion of tension adjusting screw 18 holds a retaining ring 21 upon which washer 20 rests. Retaining ring 21 prevents the accidental removal of tension adjusting screw 18, and also has another purpose which will presently appear. To increase frictional retardation of reel rotation, tension adjusting screw 18 may be rotated in such direction as to compress tensioning spring 19 between the shoulder of tension adjusting screw 18 and brake arm 14 thereby compressing brake shoe 15 against hub 7. It will also be readily understood that the reverse rotation of tension adjusting screw 18 will reduce compression of brake shoe 15 against hub 7 thereby reducing frictional retardation of reel rotation. Sufficient reverse rotation of tension adjusting screw 18 causes washer 20 resting on retaining ring 21 to contact brake arm 14, whereupon further reverse rotation of tension adjusting screw 18 results in brake shoe 15 being lifted from contact with hub 7, thus eliminating retarding action of the brake altogether and permitting freest possible rotation of the reel. Retaining ring 22 is held in a circumferential groove around the outer end of spindle 3 and serves to hold bearing 6 and the remaining rotating assembly onto spindle 3. Metal washer 23 and felt washer 24 seal the interior of hub 7 which encloses bearings 5 and 6 against the intrusion of dust and other foreign matter.

The invention having been set forth, what is claimed as new and useful is:

A fishing reel comprising a reel seat, a spindle attached to said reel seat, a reeling spider having a hub portion rotatably mounted upon and concentric with said spindle, a brake arm hinged to said reel seat at one end and having a brake shoe at the other end which may be adjusted to contact the peripheral surface of said hub thereby providing adjustable frictional retardation to the rotation of said hub, a tension adjusting screw received by a threaded hole in a flanged portion of said reel seat, said tension adjusting screw having a shoulder below the threaded portion which contacts one end of a coiled tensioning spring, said tension adjusting screw having an unthreaded portion of reduced diameter below said shoulder which portion passes concentrically through said tensioning spring and through a hole in said brake arm thereby confining said tensioning spring between said shoulder and said arm, a circumferential groove about the lower end of said unthreaded portion of said tension adjusting screw which groove carries a retaining ring which forms a shoulder about the lower end of said unthreaded portion below said hole in said arm thereby preventing the accidental removal of said tension adjusting screw and also affording a means whereby continued rotation of said tension adjusting screw in the proper direction will cause said retaining ring to contact said brake arm whereupon further rotation of the screw in the same direction will cause said brake shoe to be removed from contact with said hub, thereby releasing the adjustable frictional retardation of reel rotation entirely from operating and permitting freest possible rotation of the reel.

References Cited in the file of this patent
UNITED STATES PATENTS
2,180,566    Thompson _____ Nov. 21, 1939